United States Patent
McNamara et al.

(10) Patent No.: US 8,971,935 B2
(45) Date of Patent: *Mar. 3, 2015

(54) METHODS FOR PROVIDING ADDITIONAL INFORMATION FOR A MOBILE-ORIGINATED SHORT MESSAGE SERVICE

(71) Applicant: AT&T Mobility II LLC, Atlanta, GA (US)

(72) Inventors: Justin McNamara, Dunwoody, GA (US); Fulvio Cenciarelli, Suwanee, GA (US); Ed Lambert, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 4 days.

This patent is subject to a terminal disclaimer.

(21) Appl. No.: 13/777,186

(22) Filed: Feb. 26, 2013

(65) Prior Publication Data

US 2013/0172028 A1    Jul. 4, 2013

Related U.S. Application Data

(63) Continuation of application No. 11/848,633, filed on Aug. 31, 2007, now Pat. No. 8,396,074.

(51) Int. Cl.
*H04W 4/14* (2009.01)
*H04L 29/08* (2006.01)

(52) U.S. Cl.
CPC .............. *H04W 4/14* (2013.01); *H04L 67/104* (2013.01)
USPC .......................................... 455/466; 370/315

(58) Field of Classification Search
USPC .................. 370/465–467, 315; 455/406, 419, 455/432.1, 435.2, 435.1
See application file for complete search history.

(56) References Cited

U.S. PATENT DOCUMENTS

| 7,711,002 | B2* | 5/2010 | Mukherjee et al. | 370/467 |
| 7,711,620 | B2* | 5/2010 | Abifaker | 705/35 |
| 7,738,488 | B2* | 6/2010 | Marsico et al. | 370/466 |
| 2003/0073440 | A1* | 4/2003 | Mukherjee et al. | 455/435 |
| 2003/0084177 | A1* | 5/2003 | Mulligan | 709/230 |
| 2004/0081110 | A1* | 4/2004 | Koskimies | 370/315 |
| 2005/0044082 | A1* | 2/2005 | Chande et al. | 707/10 |
| 2006/0030333 | A1* | 2/2006 | Ward et al. | 455/456.1 |

OTHER PUBLICATIONS

Reynolds et al, Composite Capability/Preference Profiles (CC/PP): A user side framework for content negotiation, www.w3.org/1999/07/NOTE-CCPP-1990727.

* cited by examiner

*Primary Examiner* — Myron K Wyche
(74) *Attorney, Agent, or Firm* — Parks Wood LLC

(57) ABSTRACT

Methods for appending additional device, location, and/or presence information to a mobile-originated short message are taught herein. One such method for appending additional device information includes receiving a MO short message at a message center. The MO short message includes a content request. Message center sends a query to a subscriber directory for device information corresponding to the device of the requesting subscriber. The subscriber directory searches the device information and generates a response to be sent to the message center, the response including the device information. The subscriber directory sends the response to the message center, which appends the device information to the MO short message. The message center then sends the short message to the destination, for example, a content provider. Methods for appending location and/or presence information are also taught.

20 Claims, 8 Drawing Sheets

METHODS FOR PROVIDING ADDITIONAL INFORMATION FOR A MOBILE-ORIGINATED SHORT MESSAGE SERVICE

TECHNICAL FIELD

The present invention relates generally to short messages and, more particularly, to providing additional information for a mobile originated short message.

BACKGROUND

Short Message Service (SMS) was introduced in the first phase of GSM (Global System for Mobile communications) as a simple store and forward text messaging system. Initially, network operators failed to market the service. However, since then, text messaging has seen a dramatic increase in usage. This can likely be attributed to the popularity of the service among youth subscribers.

SMS is a $2^{nd}$ generation (2G) network technology. 2.5G and 3G network technology has enabled what is known as Multimedia Message Service (MMS). MMS allows a subscriber to not only send a text message, as with SMS, but also attach images, music, video clips, or voice messages.

In addition to standard messaging, SMS/MMS can be used as an enabling bearer for Wireless Application Protocol or WAP. Other technologies such as Unstructured Supplementary Service Data (USSD), circuit-switched traffic channels (TCH), or General Packet Radio Service (GPRS) can also be used as an enabling bearer for WAP. In general, WAP is a protocol standard designed to allow Internet content to be viewed on the screen of a mobile device, such as a cellular telephone, personal digital assistant, pager, and the like. In addition to facilitating the display of Internet content, WAP was developed to minimize processor and memory load due to the limitations of the processing systems inherent in such devices. A WAP gateway can be used to convert Hypertext Markup Language (HTML) Internet content to Wireless Markup Language (WML), a language the WAP device is capable of understanding to display the content.

SMS can be used to request content, such as games, ringtones, music, video, and the like. Typically, an SMS message is sent to a content provider requesting specific content. The content provider can generate a message with a URL link to the requested content. The message can be sent via SMS in a regular encoded message or using the push access protocol (PAP) to encapsulate the content. Upon receipt, the user can select the URL link to initiate a WAP session so that the requested content can be retrieved.

Often times, a subscriber will request content unknowing that the content is indeed not compatible with the subscriber's device. This can be frustrating, especially if the subscriber is charged for content not compatible with their device. The subscriber then has to contact customer service to attempt to receive a refund, all complicating what should be a simple transaction. In addition, a subscriber may be roaming in a different location and the content may not be tailored for that location (e.g., weather forecasts)

Thus, the applicant desires to create a need and market for novel methods to append device information to an SMS message to ensure the requested content is compatible with the device. The applicant also desires to create a need and market for novel methods to append location and/or presence information to an SMS message for use in delivering location and/or presence sensitive content, among other cases.

SUMMARY

One aspect of the present invention is a method for appending device information to a mobile-originated (MO) short message. The method includes receiving a MO short message at a message center. The MO short message includes a content request. The content request can include a body and/or a destination address of the message. The message center sends a query to a subscriber directory for device information corresponding to the device of the requesting subscriber. The subscriber directory searches for the device information and generates a response to be sent to the message center, the response including the device information. The subscriber directory sends the response to the message center, which appends the device information to the MO short message. The message center then sends the short message to the destination, for example, a content provider.

In one embodiment, the MO short message delivered to the content provider is a Short Message Peer-to-Peer (SMPP) message. Accordingly, the device information is appended as optional Tag Length Values (TLVs) to an SMPP protocol data unit (PDU), for example a deliver_sm or data_sm PDU. As these fields are optional, the message can still be delivered to content providers that do not support the additional subscriber information.

In another embodiment, the device information includes at least one of device type, device manufacturer, device model, device name, device size, device software version, device firmware version, device hardware version, device display size, device display resolution, device processor characteristics, and device memory characteristics. In yet another embodiment, the device information includes an International Mobile Equipment Identity (IMEI).

In another aspect of the present invention, there is provided a method for appending location information to a MO short message. The method includes receiving a MO short message at a message center. The MO short message includes a content request. The message center sends a query to a mobile location center for location information corresponding to the requesting subscriber. The mobile location center determines a current location of the requesting subscriber and generates a response to be sent to the message center. The response includes the current location. The mobile location center sends the current location to the message center, which appends the current location to the MO short message and sends the MO short message to the destination content provider.

In one embodiment, the MO short message is a SMPP message. Accordingly, the device information is appended as a TLV to an SMPP protocol data unit (PDU).

In another embodiment, the MO short message delivered to the content provider is a SMPP message. Accordingly, the location information is appended as optional TLVs to an SMPP deliver_sm data PDU. As these fields are optional, the message can still be delivered to content providers that do not support the additional subscriber information.

In another embodiment, the current location includes at least one cell identity. In yet another embodiment, the current location includes at least one location area.

In another aspect of the present invention, there is provided a method for appending presence information to a MO short message. The method includes receiving a MO short message at a message center. The MO short message includes a content request. The message center sends a query to a presence server for presence information corresponding to the requesting subscriber. The presence server determines a current presence of the requesting subscriber and generates a response to be sent to the message center. The response includes the current presence. The presence server sends the current presence to the message center, which appends the current presence to the MO short message and sends the MO short message to the destination.

In one embodiment, the MO short message delivered to the content provider is a SMPP message. Accordingly, the presence information is appended as optional TLVs to an SMPP deliver_sm PDU. As these fields are optional, the message can still be delivered to content providers that do not support the additional subscriber information.

In another embodiment, the current presence includes at least one of available, not available, do not disturb, and a subscriber generated notation.

DETAILED DESCRIPTION

As required, detailed embodiments of the present invention are disclosed herein. It must be understood that the disclosed embodiments are merely exemplary examples of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
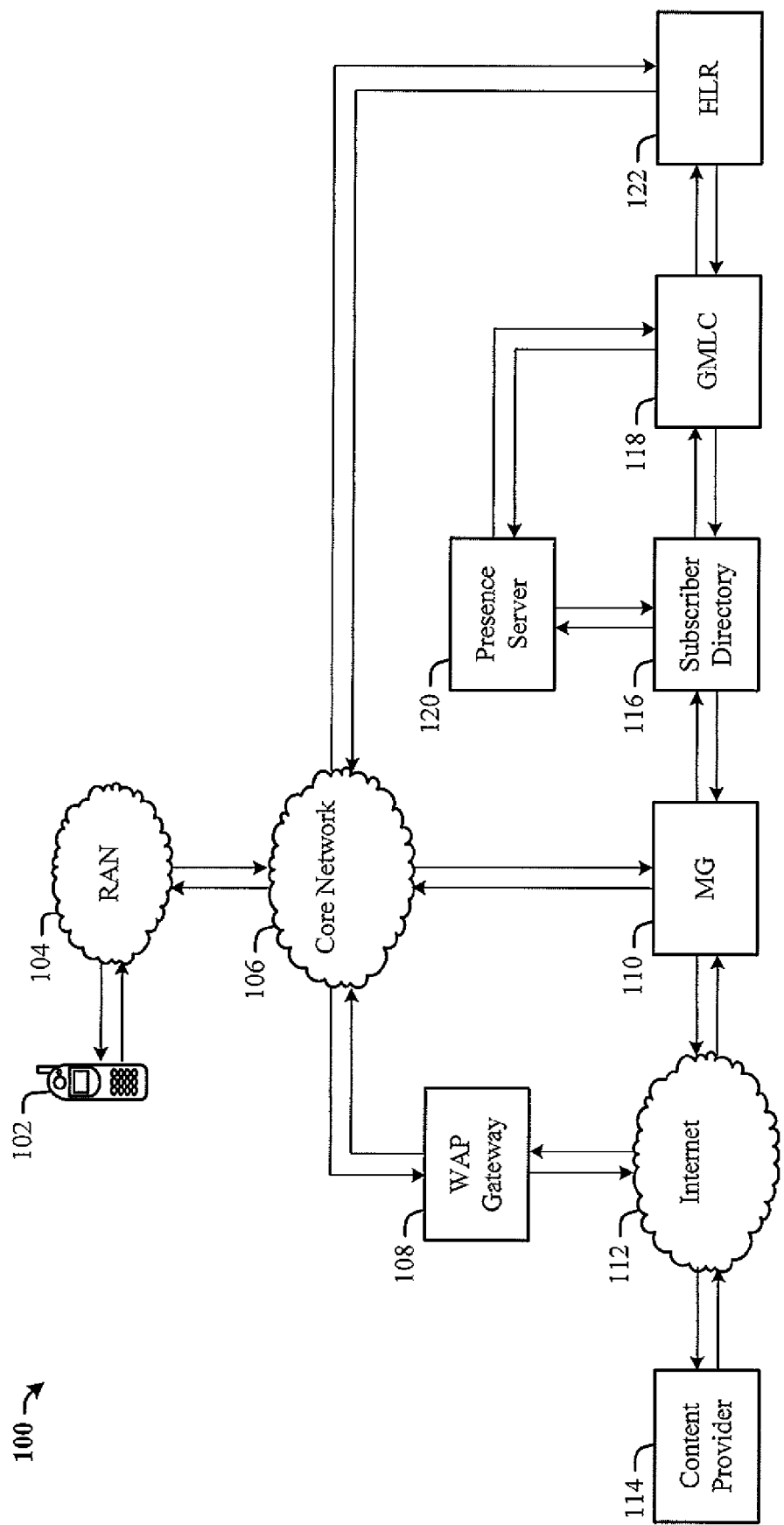
FIG. 1 illustrates an exemplary environment in which the present invention can be practiced.

Referring now to the drawings wherein like numerals represent like elements throughout the several views, FIG. 1 illustrates an exemplary communications network 100, according to the present invention. It should be understood that the present invention can be practiced within any network, such as GSM, capable of supporting short messaging services. Short Message Peer-to-Peer (SMPP) protocol is used herein to describe the present invention; however, other protocols are contemplated. Accordingly, this disclosure assumes a general understanding of SMPP. Should the reader require further explanation, the reader is invited to review the SMS Forum technical specification for Short Message Peer-to-Peer (SMPP) protocol Version 3.4 or 5.0 (SMPP protocol specification V3.4/V5.0).

The illustrated communications network 100 includes a mobile terminal 102 that is in communication with a radio access network (RAN) 104. The RAN 104 performs the radio functionality of the network 100 and provides connection to the core network 106. A RAN 104 typically includes a controller and several transmitters/receivers. In GSM, for example, the controller is a base station controller (BSC) and the transmitter/receivers are called base transceiver stations (BTS). In UMTS, for example, the controller is a radio network controller (RNC) and the transmitters/receivers are called Node B elements.

The core network can be a GSM or a UMTS core network infrastructure, integrating circuit and packet switched traffic. The core network 106 can include, for example, a mobile switching center (MSC), a visitor location register (VLR), a home location register (HLR), a serving GPRS support node (SGSN), and a gateway GPRS support node (GGSN). Of these elements, only the HLR 122 is illustrated outside of the core network 106 to illustrate various embodiments of the present invention, particularly those relevant to location information.

The core network 106 interconnects various other elements of the network 100. The core network 106 is in communication with a WAP gateway 108, the HLR 122, and a messaging gateway (MG) 110. The MG 110 can include, for example, a short message service center (SMSC) and/or a multimedia message service center (MMSC). The WAP gateway 108 is primarily responsible for converting HTML Internet 112 content to WML so that it can be understood and displayed by the mobile terminal 102. Some mobile terminals, however, include native support for HTML and other web languages, these mobile terminals would not require this conversion prior to receiving the Internet 112 content. In other cases, content is pre-formatted to WML prior to arriving at the WAP gateway 108. In these cases, the WAP gateway 108 functions to simply access web content for the mobile terminal 102 and does not perform the conversion. The WAP gateway 108 is in communication with the Internet 112 that in turn is in communication with at least one content provider 114. The content provider 114 can offer content, such as, but not limited to, ringtones, music, video, interactive media (e.g., games), e-books, and images, for example. The Internet 112 is also in communication with the MG 110.

The MG 110 is in communication with the Internet 112, the core network 106, and a subscriber directory 116 that, in turn, is in communication with a gateway mobile location center (GMLC) 118 and a presence server 120. In the illustrated embodiment, the MG 110 communicates directly with the subscriber directory 116. In an alternative embodiment, the MG 110 can communicate directly with any of the content data sources (i.e., the GMLC 118, the presence server 120, the HLR 122, etc.). The subscriber directory 116 can include subscriber account information for at least a portion of a network operator's subscriber base. Subscriber account information can include, but is not limited to, billing address information, account type, account features, account status (e.g., paid or delinquent), and the mobile device type (e.g., via an International Mobile Equipment Identity (IMEI)). The MG 110 can query the subscriber directory 116 to determine if a particular subscriber, for example, a subscriber requesting content from content provider 114, is allowed/validated to access the requested content. The GMLC 118 includes functionality to support location services. The GMLC 118 can request routing information from a home location register (HLR) 122. After performing registration authorization, the GMLC 118 can send a positioning request to an MSC, V-MSC, or SGSN located in the core network 106. The GMLC 118 can then receive final location estimates from the core network 106. These various entities are not shown so as not to obscure the present invention; instead the GMLC 118 is illustrated as being in communication with an HLR 122 to receive preliminary location estimates. It is to be assumed that the final location estimates are received from one of the above entities within the illustrated core network 106 and stored at the GMLC 118. The GMLC 118 can provide the subscriber directory 116 with the location information. The location information can be appended to a short message at the MG 110 for delivery in a content request (e.g., as an SMPP PDU) to the content provider 114. The location information can be used for location sensitive content.

The subscriber directory 116 and GMLC 118 are both in communication with a presence server 120. The presence server 120 provides presence related information to the subscriber directory 116 for presence sensitive content. The presence server 116 can include availability information and may be enhanced with location information obtained from the GMLC 116.

FIG. 1 has been described as an exemplary environment in which various embodiments of the present invention can be implemented. FIGS. 2-7 describe these embodiments through various message flows.

Figure 2:
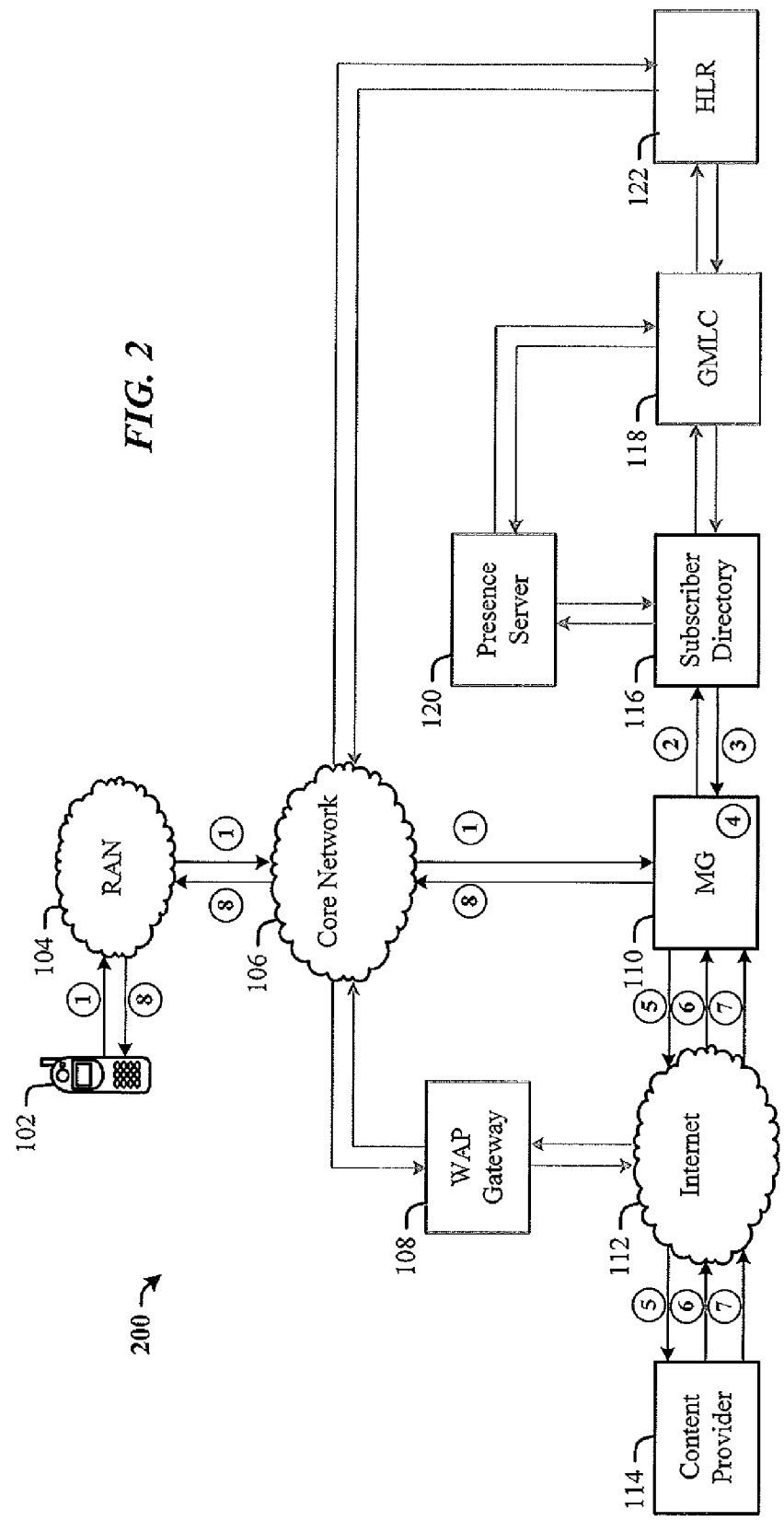
FIG. 2 illustrates an exemplary message flow in accordance with an embodiment of the present invention.

Referring now to FIG. 2, an exemplary environment 200 incorporating an exemplary message flow is illustrated. The illustrated message flow is used to determine mobile terminal information, such as device type, and append this information to a mobile-originated (MO) short message requesting content from a content provider.

The mobile terminal 102 first sends a content request [1] to the RAN 104. The content request [1] is forwarded from the RAN 104 to the core network 106. The request can be in the format of a Forward Short message (GSM 23.040) and includes a destination address and/or text in the body of the message. The core network 106 routes the content request [1] to the MG 110. The MG 110 can require validation of the originating subscriber prior to sending the short message to the intended party, in this case, the content provider 114. Accordingly, a validation_query [2] can be sent to the subscriber directory 116 to validate the originating subscriber's account information. In an exemplary embodiment, the validation_query is an LDAP (lightweight directory access protocol) query, although other access protocols, as understood by those skilled in the art, are contemplated. As aforementioned, subscriber account information stored within the subscriber directory 116 can include, but is not limited to, billing address information, account type, account features, account status (e.g., paid or delinquent), and the mobile device type (e.g., via IMEI).

The MG 110 can make a determination if a request for device information is required by the content request [1]. The MG can validate if the destination address in the content request was provisioned in a table that identified the content as requiring device information. For example, when the subscriber submits a short message requesting content from a particular content provider, the content provider can require device information to insure the request is fulfilled with the appropriate content. Accordingly, upon receipt of the content request [1], the MG 110 can generate a validation/device_query [2] to request device information, for example, in the form of an IMEI. The subscriber directory 116 can validate the originating subscriber's account information and in a validation/device_query_resp [3], provide the MG 110 with the IMEI and validation status. As privacy concerns are paramount, the mobile operator may require that the subscriber allow the content provider to retrieve the device information, for example, during the validation query. It should be understood that other device information can be used in lieu of or in addition to the IMEI. Upon receipt of the validation/device_query_resp [3], the MG 110 can append the IMEI to the short message [4]. In one exemplary embodiment, the IMEI is attached as a new tag length value (TLV) in an SMPP protocol data unit (PDU) that is to be sent to the content provider 114. For example, the MG 110 can append [4] the IMEI as a TLV of a deliver_sm PDU. The deliver_sm PDU can be sent [5] to the content provider 114 after the two entities are properly bound, for example, in accordance with SMPP specifications. The content provider 114 can receive the PDU and determine a format suitable for the originating device in which to provide the requested content, after which the content provider generates a deliver_sm_resp PDU [6] that is delivered to the MG 110. In another embodiment, the MG 110 delivers the content as a Web Service SOAP notification message (see Parlay-X Multimedia messaging_ 29.199-05). The content provider can retrieve the content from the MG 110 with the attached device information. The content provider can format the content to provide the best experience to the subscriber for the subscriber's device. In this embodiment, the content provider can generate the content as a multimedia message that can incorporate audio and visual content tailored for the device. The content is then sent [7] to the MG 110 This content can be encapsulated under the HTTP MM7 protocol for MMS. As the message will have content adapted specifically for the device, the content provider can disable the content adaptation flag on MM7 to prevent the MG 110 from adapting the content. The MG 110 receives the content via MM7, for example, and forwards it [8] to the core network 106 that routes the content notification [8] to the RAN 104 over MM1. The RAN 104 then sends the content [8] over an air interface to the requesting mobile terminal 102. When the subscriber receives the notification, the MMS message can be retrieved using the standard MM1 retrieval mechanism identified in GSM 23.140.

Figure 3:
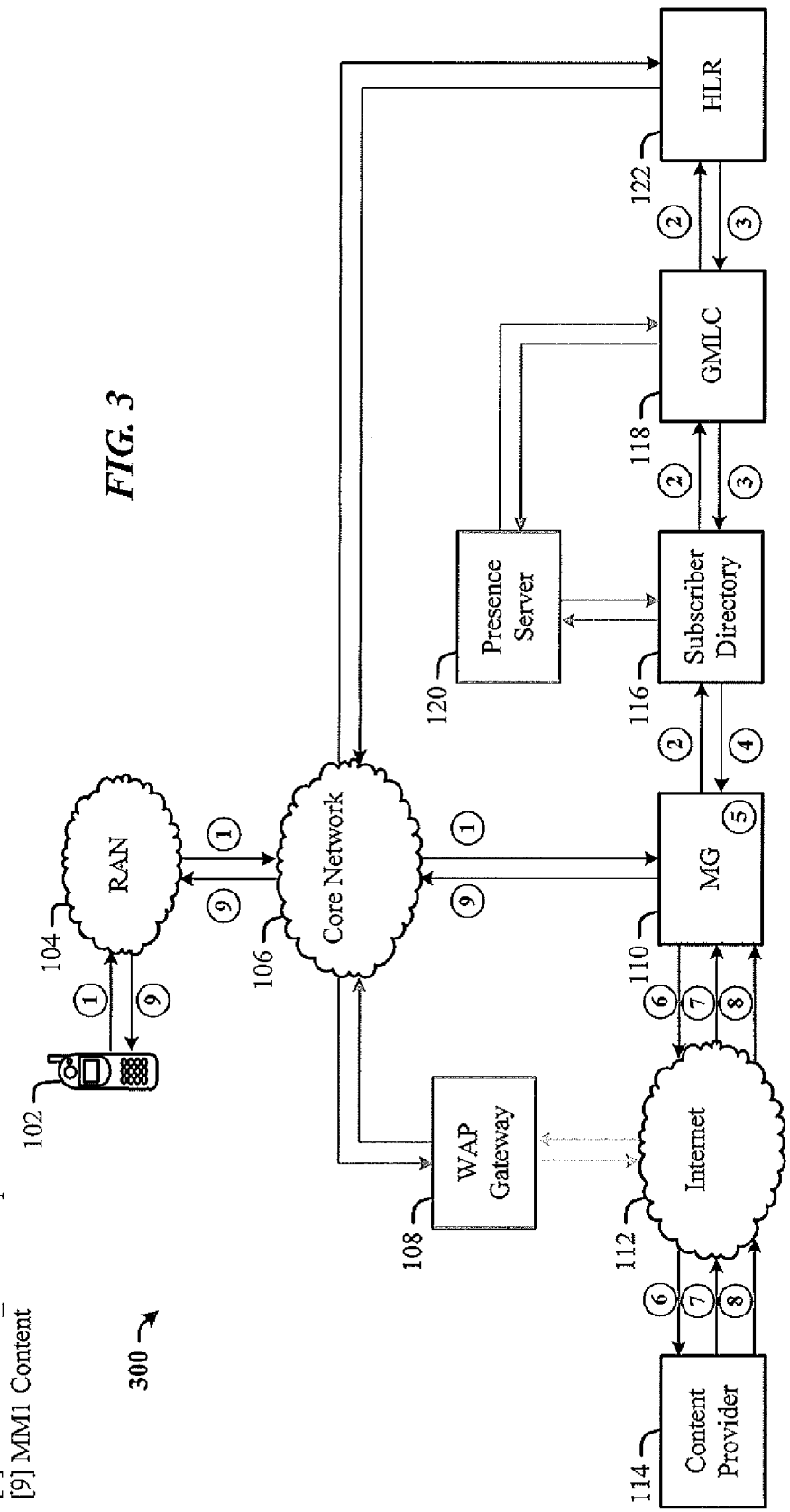
FIG. 3 illustrates an exemplary message flow in accordance with an embodiment of the present invention.

Referring now to FIG. 3, another exemplary environment 300 incorporating an exemplary message flow is illustrated. The illustrated message flow is used to determine subscriber location information and append this information to a mobile-originated (MO) short message requesting content from a content provider.

The mobile terminal 102 first sends a content request [1] to the RAN 104. The content request [1] is forwarded from the RAN 104 to the core network 106. The core network 106 routes the content request [1] to the MG 110. The MG 110 can require validation of the originating subscriber prior to sending the short message to the intended party, in this case, the content provider 114. Accordingly, a validation_query [2] can be sent to the subscriber directory 116 to validate the originating subscriber's account information. In addition, the validation_query can include a location query for a location sensitive content request. For example, a location sensitive content request can be a content that is location specific, such as advertising content or interactive media content.

The content request [1] can include a request for location information. For example, when the subscriber submits a short message requesting content from a particular content provider, the content provider can require location information to insure the request is fulfilled with the appropriate content based on the subscriber's location. Accordingly, upon receipt of the content request [1], the MG 110 can generate a validation/location_query [2] to request location information and validate the subscriber. The subscriber directory 116 can validate the originating subscriber's account information and forward a location_query [2] to the GMLC 118. The GMLC 118 can receive the location_query [2] and request a preliminary location estimate from the HLR 122, which may request a location estimate from other entities within the core network 106, for example, a VLR. The HLR 122 returns the current location information [3] to the GMLC 118. The current location information is then forwarded to the subscriber directory 116. The subscriber directory 116 generates a validation/location_query_resp [4] and sends the response to the MG 110. The MG 110 can append [5] the location information to the short message. In one exemplary embodiment, the location information is attached as a new TLV in an SMPP PDU that is to be sent to the content provider 114. For example, the MG 110 can append location as a TLV of a deliver_sm PDU. The deliver_sm PDU can be sent [6] to the content provider 114 after the two entities are properly bound in accordance with SMPP specifications. The content provider 114 can receive the PDU and generates a deliver_sm_resp PDU [7] that is sent to the MG 110. Based on the TLV, the content provider 114 can format the content to provide the best experience for that location. In this embodiment, the content provider 114 can generate the content as a multimedia message that can incorporate audio and visual content tailored for the device the content is then sent [8] to the MG 110 This content can be encapsulated under the HTTP MM7 protocol for MMS. As the message will have content adapted specifically for the device, the content provider can disable the content adaptation flag on MM7 to prevent the MG 110 from adapting the content. The MG 110 receives the content via MM7 and forwards it [9] to the core network 106 that routes the content notification [9] to the RAN 104 over MM1. The RAN 104 then sends the content [9] over an air interface to the requesting mobile terminal 102. When the subscriber receives the notification, the MMS message can be retrieved using the standard MM1 retrieval mechanism identified in GSM 23.140.

Figure 4:
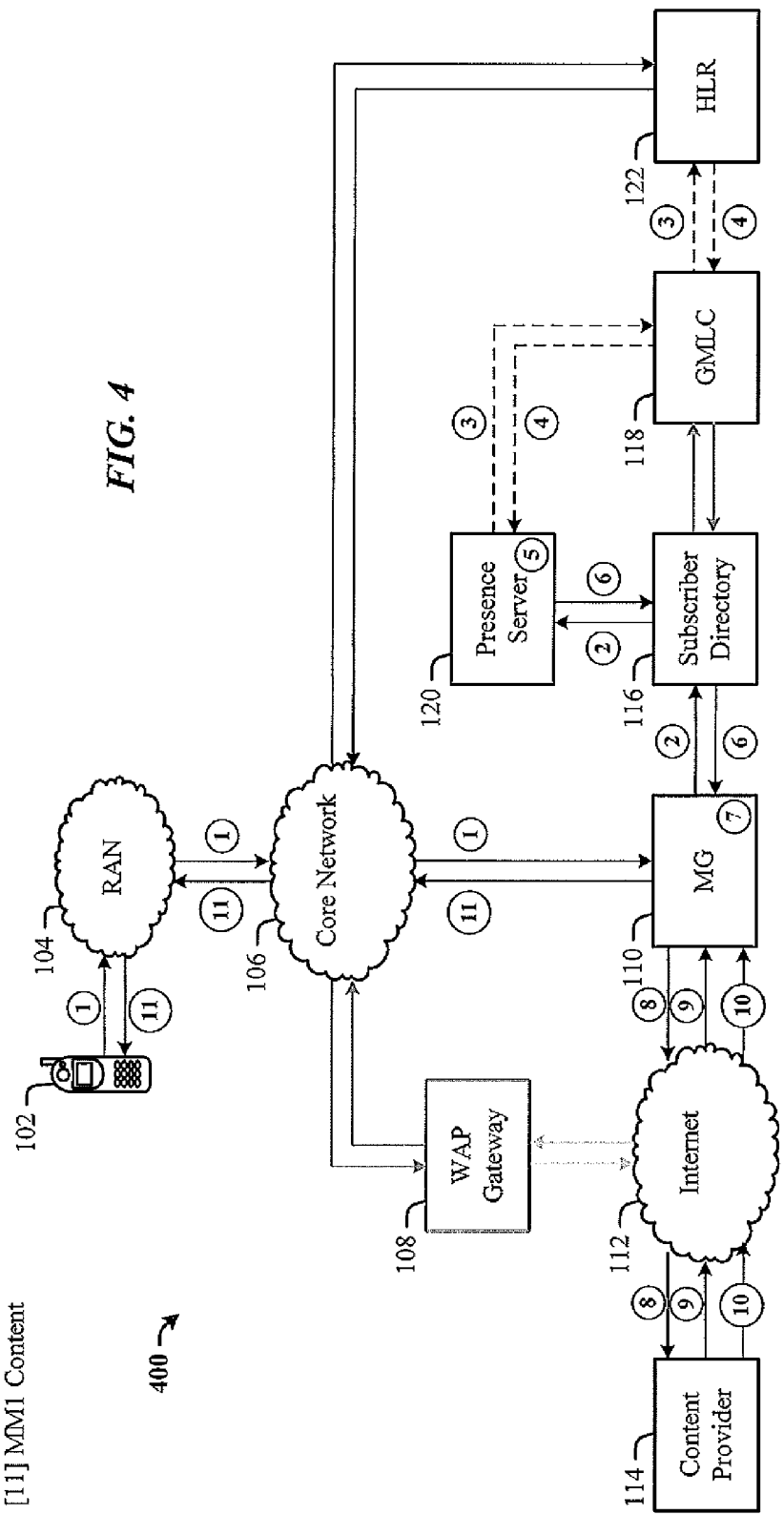
FIG. 4 illustrates an exemplary message flow in accordance with another embodiment of the present invention.

Referring now to FIG. 4, yet another exemplary environment 400 incorporating an exemplary message flow is illustrated. The illustrated message flow is used to determine subscriber presence information and append this information to a MO short message requesting content from a content provider.

The mobile terminal 102 first sends a content request [1] to the RAN 104. The content request [1] is forwarded from the RAN 104 to the core network 106. The core network 106 routes the content request [1] to the MG 110. The MG 110 can require validation of the originating subscriber prior to sending the short message to the intended party, in this case, the content provider 114. Accordingly, a validation_query [2] can be sent to the subscriber directory 116 to validate the originating subscriber's account information. In addition, the validation_query can include a presence_query for a presence sensitive content request.

The content request [1] can include a request for presence information. For example, when the subscriber submits a short message requesting content from a particular content provider, the content provider can require presence information to insure the request is fulfilled with the appropriate content based on the subscriber's presence. Accordingly, upon receipt of the content request [1], the MG 110 can generate a validation/presence_query [2] to request presence information. The subscriber directory 116 can validate the originating subscriber's account information and forward a presence_query [2] to the presence server 120.

The presence server 120 can maintain the presence status of a network's subscribers. It is this presence status that can be acquired in response to a presence_query. In some instances, location information may be requested in addition to presence information. In such a case, the presence server 120 can request location information directly from the GMLC 118 [3]. Otherwise a location_query, as previously described, can be generated by and sent from the subscriber directory 116 to the GMLC 118. In case of the former, the optional location_query [3] is sent to the GMLC 118. The GMLC 118 requests [3] a preliminary location estimate from the HLR 122 and may request a location estimate from other entities within the core network 106, for example, a VLR. The HLR 122 returns the current location information [4] to the GMLC 118, which then forwards the location information [4] to the presence server 120. The presence server 120 appends [5] the location information and the presence information to a presence_query_resp PDU that is sent [6] to the subscriber directory 116 and forwarded [6] to the MG 110. The MG 110 can append [7] the presence information and/or location information, if applicable, to the short message. In one exemplary embodiment, the presence information is attached as a new TLV in an SMPP PDU that is to be sent to the content provider 114. For example, the MG 110 can append [7] presence/location information in a TLV field of a deliver_sm PDU. The deliver_sm PDU can be sent [8] to the content provider 114 after the two entities are properly bound in accordance with SMPP specifications. The content provider 114 can receive the PDU and determine the content appropriate for the presence status, after which the content provider 114 generates a deliver_sm_resp PDU [9] that is delivered to the MG 110. Based on the TLV, the content provider 114 can format the content to provide the best experience for that location and presence information. In this embodiment, the content provider 114 can generate the content as a multimedia message that can incorporate audio and visual content tailored for the device the content is then sent [10] to the MG 110. This content can be encapsulated under the HTTP MM7 protocol for MMS. As the message will have content adapted specifically for the device, the content provider can disable the content adaptation flag on MM7 to prevent the MG 110 from adapting the content. The MG 110 receives the content via MM7 and forwards it [11] to the core network 106 that routes the content notification [11] to the RAN 104 over MM1. The RAN 104 then sends the content [11] over an air interface to the requesting mobile terminal 102. When the subscriber receives the notification, the MMS message can be retrieved using the standard MM1 retrieval mechanism identified in GSM 23.140.

Figure 5:
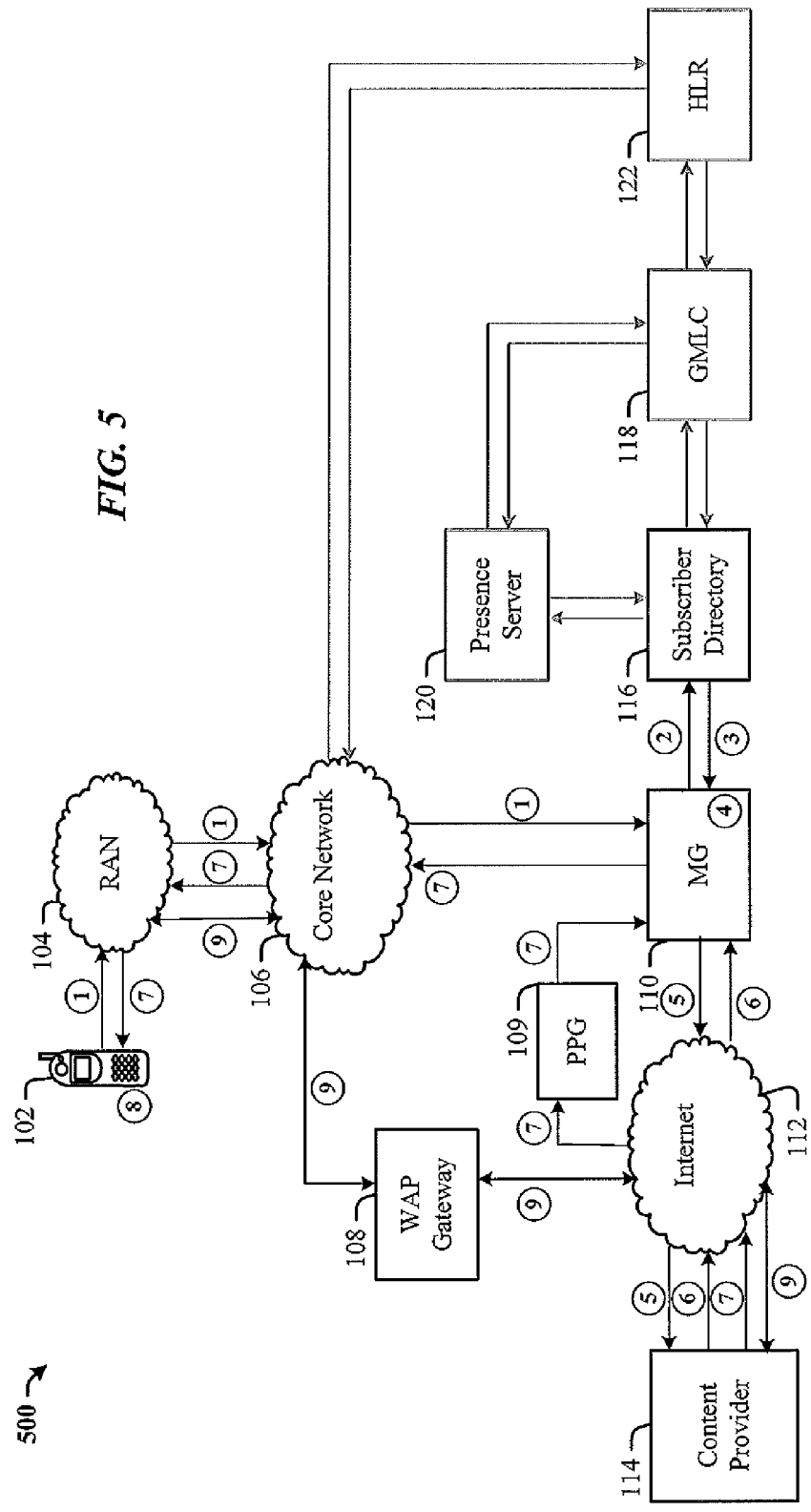
FIG. 5 illustrates an exemplary message flow in accordance with yet another embodiment of the present invention.

Referring now to FIG. 5, another exemplary environment 500 incorporating an exemplary message flow is illustrated. The illustrated message flow is used to determine mobile terminal information, such as device type, and append this information to a mobile-originated (MO) short message requesting content from a content provider. The message flow described in FIG. 5 is similar to that of FIG. 2, however, in this implementation a WAP push is sent to the requesting mobile terminal 102. The subscriber can then follow a URL link to retrieve the requested content.

The mobile terminal 102 first sends a content request [1] to the RAN 104. The content request [1] is forwarded from the RAN 104 to the core network 106. The core network 106 routes the content request [1] to the MG 110. The MG 110 can require validation of the originating subscriber prior to sending the short message to the intended party, in this case, the content provider 114. Accordingly, a validation_query [2] can be sent to the subscriber directory 116 to validate the originating subscriber's account information.

The content request [1] can include a request for device information. For example, when the subscriber submits a short message requesting content from a particular content provider, the content provider can require device information to insure the request is fulfilled with the appropriate content. Accordingly, upon receipt of the content request [1], the MG 110 can generate a validation/device_query [2] to request device information, for example, in the form of an IMEI. The subscriber directory 116 can validate the originating subscriber's account information and in a validation/device_query_resp [3], provide the MG 110 with the IMEI. It should be understood that other device information can be used in lieu of or in addition to the IMEI. Upon receipt of the validation/device_query_resp [3], the MG 110 can append the IMEI to the short message [4]. In one exemplary embodiment, the IMEI is attached as a new TLV in an SMPP PDU that is to be sent to the content provider 114. For example, the MG 110 can append [4] the IMEI as a TLV of a deliver_sin PDU. The deliver_sm PDU can be sent [5] to the content provider 114. In response, the content provider 114 generates a deliver_sm_resp PDU [6] that is delivered to the MG 110 and can determine a format suitable for the originating device in which to provide the requested content. It is contemplated that the content provider 114 can now deliver a link to the newly formatted content as a WAP push service indication (SI) message with an embedded URL. [7] to a push proxy gateway (PPG) 109. The PPG 109 can convert the PAP message to a properly formatted notification message (normally SMPP) and forward to the MG 110 for delivery [7]. The MG 110 can forward the notification message to the core network 106, through the RAN 104 and to the requesting mobile terminal 102. The URL link can be displayed [8] on a display of the mobile terminal. The subscriber can then engage the link to initiate a download of the requested content [9] through the WAP Gateway 108.

Figure 6:
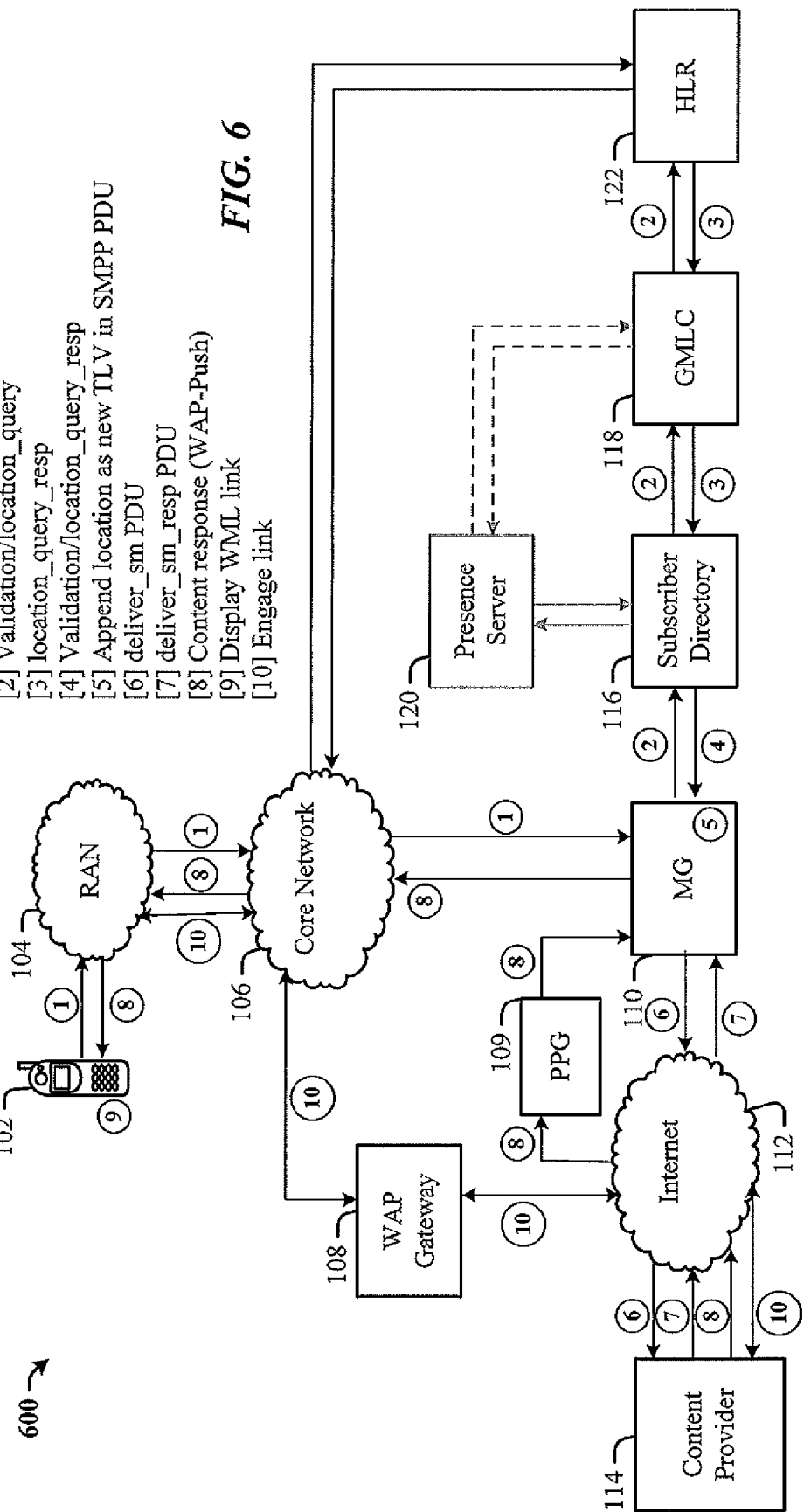
FIG. 6 illustrates an exemplary message flow in accordance with still another embodiment of the present invention.

Referring now to FIG. 6, another exemplary environment 600 incorporating an exemplary message flow is illustrated. The illustrated message flow is used to determine subscriber location information and append this information to a mobile-originated (MO) short message requesting content from a content provider. The message flow described in FIG. 6 is similar to that of FIG. 3, however, in this implementation a WAP push is sent to the requesting mobile terminal 102. The subscriber can then follow a URL link to retrieve the requested content.

The mobile terminal 102 first sends a content request [1] to the RAN 104. The content request [1] is forwarded from the RAN 104 to the core network 106. The core network 106 routes the content request [1] to the MG 110. The MG 110 can require validation of the originating subscriber prior to sending the short message to the intended party, in this case, the content provider 114. Accordingly, a validation_query [2] can be sent to the subscriber directory 116 to validate the originating subscriber's account information. In addition, the validation_query can include a location query for a location sensitive content request. For example, a location sensitive content request can be a content that is location specific, such as advertising content or interactive media content.

The content request [1] can include a request for location information. For example, when the subscriber submits a short message requesting content from a particular content provider, the content provider can require location information to insure the request is fulfilled with the appropriate content based on the subscriber's location. Accordingly, upon receipt of the content request [1], the MG 110 can generate a validation/location_query [2] to request location information. The subscriber directory 116 can validate the originating subscriber's account information and forward the location_query [2] to the GMLC 118.

The GMLC 118 can receive the location_query [2] and request a preliminary location estimate from the HLR 122, which may request a location estimate from other entities within the core network 106, for example, a VLR. The HLR 122 returns the current location information [3] to the GMLC 118. The current location information is then forwarded to the subscriber directory 116. The subscriber directory 116 generates a validation/location_query_resp [4] and sends the response to the MG 110. The MG 110 can append the location information to the short message. In one exemplary embodiment, the location information is attached as a new TLV in an SMPP PDU [5]. The deliver_sm PDU can be sent [6] to the content provider 114. In response, the content provider 114 generates a deliver_sm_resp PDU [6] that is delivered to the MG 110 and can determine a format suitable for the originating device in which to provide the requested content. It is contemplated that the content provider 114 can now deliver [8] a link to the newly formatted content as a WAP Push SI message with an embedded URL to the PPG 109. The PPG 109 can convert the PAP message to a properly formatted notification message (normally SMPP) and forward to the MG 110 for delivery [8]. The MG 110 can forward the notification message to the core network 106, through the RAN 104, and to the requesting mobile terminal 102. The URL link can be displayed [9] on a display of the mobile terminal. The subscriber can then engage the link to initiate a download of the requested content [10] through the WAP Gateway 108.

Figure 7:
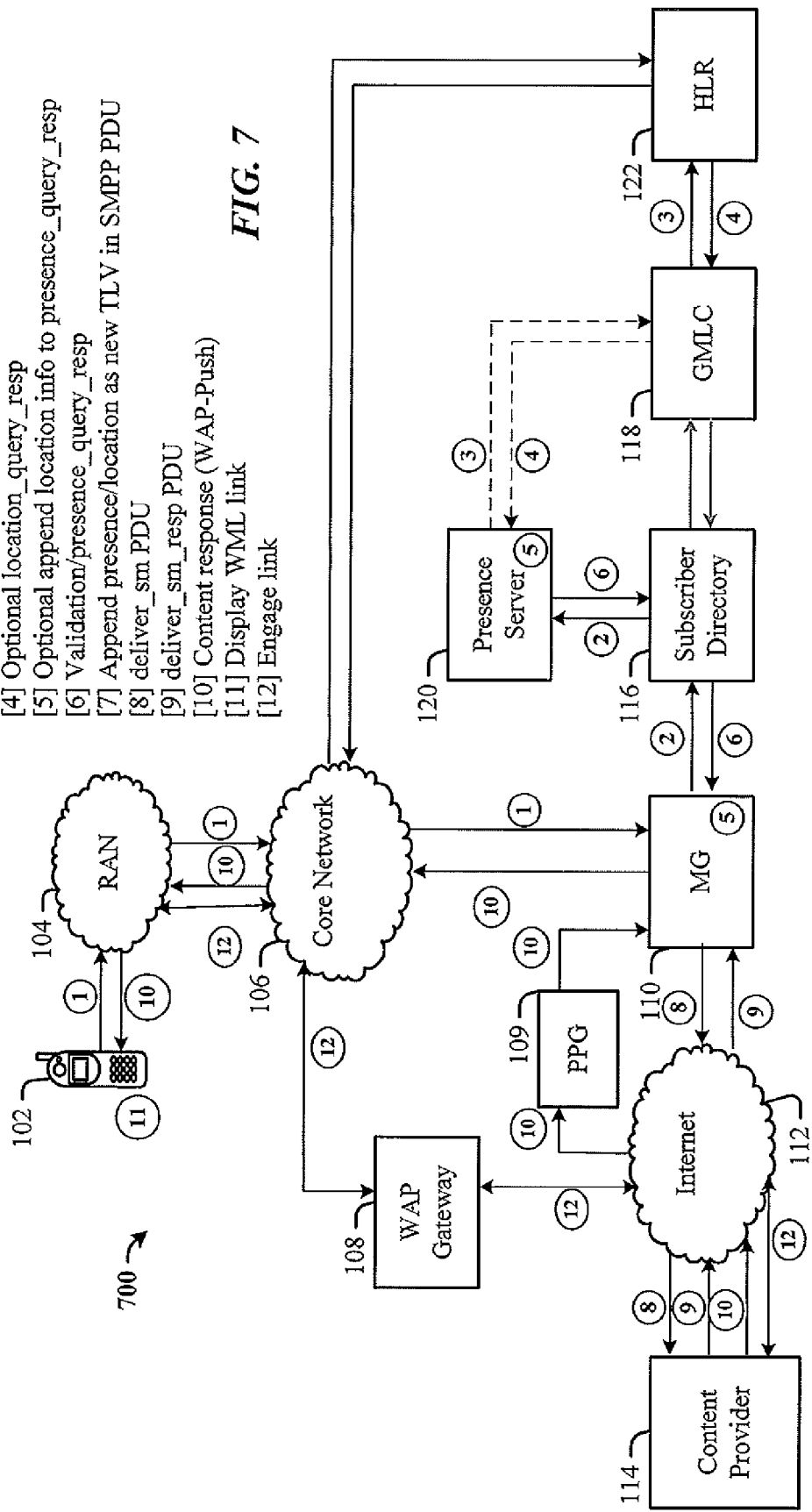
FIG. 7 illustrates an exemplary message flow in accordance with another embodiment of the present invention.

Referring now to FIG. 7, yet another exemplary environment 700 incorporating an exemplary message flow is illustrated. The illustrated message flow is used to determine subscriber presence information and append this information to a MO short message requesting content from a content provider. The message flow described in FIG. 7 is similar to that of FIG. 4, however, in this implementation a WAP push is sent to the requesting mobile terminal 102. The subscriber can then follow a URL link to retrieve the requested content.

The mobile terminal 102 first sends a content request [1] to the RAN 104. The content request [1] is forwarded from the RAN 104 to the core network 106. The core network 106 routes the content request [1] to the MG 110. The MG 110 can require validation of the originating subscriber prior to sending the short message to the intended party, in this case, the content provider 114. Accordingly, a validation_query [2] can be sent to the subscriber directory 116 to validate the originating subscriber's account information. In addition, the validation_query can include a presence_query for a presence sensitive content request.

The content request [1] can include a request for presence information. For example, when the subscriber submits a short message requesting content from a particular content provider, the content provider can require presence information to insure the request is fulfilled with the appropriate content based on the subscriber's presence. Accordingly, upon receipt of the content request [1], the MG 110 can generate a validation/presence_query [2] to request presence information. The subscriber directory 116 can validate the originating subscriber's account information and forward the presence_query [2] to the presence server 120.

The presence server 120 can maintain the presence status of a network's subscribers. It is this presence status that can be acquired in response to a presence_query. In some instances, location information may be requested in addition to presence information. In such a case, the presence server 120 can request location information directly from the GMLC 118. Otherwise a location_query, as previously described, can be generated by and sent from the subscriber directory 116 to the GMLC 118. In case of the former, the optional location_query [3] is sent to the GMLC 118. The GMLC 118 requests [3] a preliminary location estimate from the HLR 122 and may request a location estimate from other entities within the core network 106, for example, a VLR. The HLR 122 returns the current location information [4] to the GMLC 118, which then forwards the location information [4] to the presence server 120. The presence server 120 appends [5] the location information and the presence information to a presence_query_resp that is sent [6] to the subscriber directory 116 and forwarded [6] to the MG 110. The MG 110 can append [7] the presence information and location information, if applicable, to the short message. In one exemplary embodiment, the presence information is attached as a new TLV in an SMPP PDU that is to be sent to the content provider 114. For example, the MG 110 can append [7] presence/location information in a TLV field of a deliver_sm PDU.

The deliver_sm PDU can be sent [8] to the content provider 114. In response, the content provider 114 generates a deliver_sm_resp PDU [9] that is delivered to the MG 110 and can determine a format suitable for the originating device in which to provide the requested content. It is contemplated that the content provider 114 can then deliver [9] a link to the newly formatted content as a WAP push SI message with the embedded URL to the PPG 109. The PPG 109 can convert the PAP message to a properly formatted notification message (normally SMPP) and forward to the MG 110 for delivery [10]. The MG 110 can forward the notification message to the core network 106, through the RAN 104, and to the requesting mobile terminal 102. The URL link can be displayed [11] on a display of the mobile terminal. The subscriber can then engage the link to initiate a download of the requested content [12] through the WAP Gateway 108.

Figure 8:
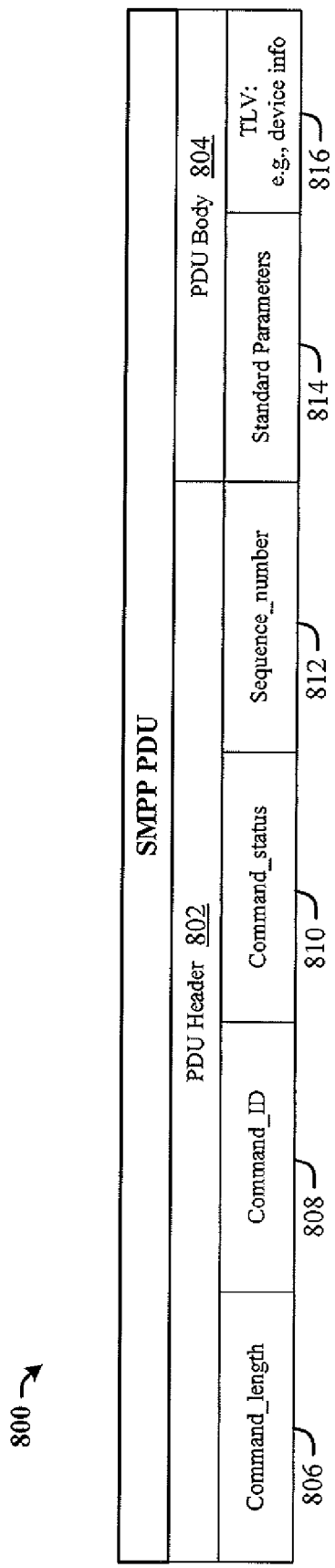
FIG. 8 illustrates an exemplary Short Message Peer-to-Peer (SMPP) protocol data unit (PDU, according to the present invention.

Referring now to FIG. 8, an exemplary SMPP PDU 800 is illustrated. The PDU 800 includes a PDU header 802 and a PDU body 804 in accordance with SMPP specifications. The SMPP specifications require a PDU header 802 to include SMPP PDU fields for command_length 806, command_ID 808, command_status 810, and sequence_number 812. Briefly, the command_length 806 indicates the overall size of the PDU including the header and body. The command_ID 808 identifies the PDU. The command_status 810 is used to carry a SMPP error code. The sequence_number 812 is used to uniquely identify a SMPP PDU in the context of a SMPP session. The PDU body 804 includes standard parameters 814 that consist of combinations of integers, C-octet strings, and octet strings that form the basic layout of any PDU body. These fields are always present even if specified in NULL form. The PDU body 804 also includes TLV parameters 816 that are identified by a tag, length, and value and can be appended to a PDU in any order. In the present invention, a TLV for device information, location information, and/or presence information can be used to provide a content provider with additional information in a MO short message for content. The tags utilized can be specified in the vendor specific 0x1400-0x3FFF range, for example.

The present invention allows a TLV to be appended to an SMPP PDU to add additional information, such as, but not limited to, device information, location information, presence information, and the like. This information is used by content providers to provide content that is appropriately formatted and conducive to the device characteristics, location, and/or presence of the requesting subscriber and mobile terminal.

The illustrated embodiments have provided scenarios wherein the destination of a MO short message is a content provider, however, in alternative embodiments the destination can be a service provider, such as a 911 call center, for example. In this embodiment, the 911 call center can receive a MO short message with appended location information, presence information, and the like to aid the 911 call center in receiving data regarding an emergency via SMS.

The functionality of the various network nodes described herein, for example, the MG 110, subscriber directory 116, presence server 120, GMLC 118, HLR 122, WAP gateway 108, and content provider 114 can be provided by one or more computer program modules. As used herein, the term "module" refers to computer program logic and/or any hardware or circuitry utilized to provide the functionality attributed to the module. Thus, a module can be implemented in hardware, firmware, and/or software.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A system, comprising:
a processor; and
a computer-readable storage device comprising instructions that, when executed by the processor, cause the processor to perform operations comprising:
receiving a mobile-originated short message, wherein:
the mobile-originated short message comprises a content request to request content; and
the mobile-originated short message comprising the content request is received from a transmitting mobile terminal;
querying, in response to receiving the mobile-originated short message comprising the content request, a subscriber directory for information corresponding to the transmitting mobile terminal;
appending transmitting-mobile-terminal information, received in response to the querying and, corresponding to the transmitting mobile terminal, to the mobile-originated short message comprising the content request; and
sending the mobile-originated short message comprising the content request, and having appended the transmitting-mobile-terminal information, corresponding to the transmitting mobile terminal, to a destination.

2. The system of claim 1, wherein the operations further comprise generating and transmitting a response, to the querying, including the transmitting-mobile-terminal information corresponding to the transmitting mobile terminal.

3. The system of claim 1, wherein the mobile-originated short message comprising the content request to request content is a Short Message Peer-to-Peer message.

4. The system of claim 1, wherein the transmitting-mobile-terminal information is appended as a Tag Length Value to a Short Message Peer-to-Peer protocol data unit.

5. The system of claim 1, wherein the transmitting-mobile-terminal information is appended as an additional parameter to a Web Service Notification.

6. The system of claim 1, wherein the transmitting-mobile-terminal information comprises at least one piece of data selected from a group consisting of: transmitting-mobile-terminal type; manufacturer; transmitting-mobile-terminal model; transmitting-mobile-terminal name; transmitting-mobile-terminal size; transmitting-mobile-terminal software version; transmitting-mobile-terminal firmware version; transmitting-mobile-terminal hardware version; transmitting-mobile-terminal display size; transmitting-mobile-terminal display resolution; transmitting-mobile-terminal processor characteristics; and transmitting-mobile-terminal memory characteristics.

7. The system of claim 1, wherein the transmitting-mobile-terminal information comprises an International Mobile Equipment Identity.

8. The system of claim 1, wherein the transmitting-mobile-terminal information includes location information corresponding to the transmitting mobile terminal.

9. The system of claim 8, wherein the location information comprises at least one cell identity corresponding to the transmitting mobile terminal.

10. The system of claim 8, wherein the location information comprises at least one location area corresponding to the transmitting mobile terminal.

11. The system of claim 1, wherein the transmitting-mobile-terminal information includes presence information.

12. The system of claim 11, wherein the presence information comprises at least one message selected from a group consisting of: available; not available; do not disturb; and a subscriber generated notation.

13. The system of claim 1, wherein the destination is a service provider.

14. A computer-readable storage device comprising instructions that, when executed by a processor, cause the processor to perform operations comprising:
receiving a mobile-originated short message, wherein:
the mobile-originated short message comprises a content request to request content; and
the mobile-originated short message comprising the content request is received from a transmitting mobile terminal;
querying, in response to receiving the mobile-originated short message comprising the content request, a subscriber directory for information corresponding to the transmitting mobile terminal;
appending transmitting-mobile-terminal information, received in response to the querying, and corresponding to the transmitting mobile terminal, to the mobile-originated short message comprising the content request; and
sending the mobile-originated short message comprising the content request, having appended the transmitting-mobile-terminal information corresponding to the transmitting mobile terminal, to a destination.

15. The computer-readable storage device of claim 14, wherein the operations further comprise generating and transmitting a response including the transmitting-mobile-terminal information corresponding to the transmitting mobile terminal.

16. The computer-readable storage device of claim 14, wherein the transmitting-mobile-terminal information includes at least one particular type of information selected from a group consisting of: transmitting mobile terminal information; location information; and presence information.

17. A method, for delivering content to a transmitting mobile terminal in a telecommunications network, comprising:
receiving, by a message center using a processor, a mobile-originated short message, wherein:
the mobile-originated short message comprises a content request to request content; and
the mobile-originated short message comprising the content request is received from the transmitting mobile terminal;
querying, in response to receiving the mobile-originated short message comprising the content request, a network node for information corresponding to the transmitting mobile terminal;
sending a response to the message center;
appending, by the message center, transmitting-mobile-terminal information, received in response to the querying, and corresponding to the transmitting mobile terminal, to the mobile-originated short message comprising the content request;
sending the mobile-originated short message comprising the content request and having appended the transmitting-mobile-terminal information, corresponding to the transmitting mobile terminal, to a destination; and
delivering content corresponding to the transmitting-mobile-terminal information appended, corresponding to the transmitting mobile terminal, to the transmitting mobile terminal.

18. The method of claim 17, further comprising generating the response to be sent to the message center, the response including the transmitting-mobile-terminal information corresponding to the transmitting mobile terminal.

19. The method of claim 17, wherein the transmitting-mobile-terminal information appended to the mobile-originated short message comprising the content request includes at least one particular type of information selected from a group consisting of:
presence information corresponding to the transmitting mobile terminal; and
location information corresponding to the transmitting mobile terminal.

20. The system of claim 1, wherein the destination is a content provider.

* * * * *